(12) United States Patent
Jennrich et al.

(10) Patent No.: US 11,873,619 B1
(45) Date of Patent: Jan. 16, 2024

(54) GUARD FOR RADIATOR BLOWER UNITS OF MACHINES

(71) Applicant: Caterpillar Inc., Peoria, IL (US)

(72) Inventors: Andrew Thomas Jennrich, Naperville, IL (US); Joseph Thomas Frystak, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/929,795

(22) Filed: Sep. 6, 2022

(51) Int. Cl.
*F01P 5/06* (2006.01)
*E02F 9/08* (2006.01)

(52) U.S. Cl.
CPC ............ *E02F 9/0866* (2013.01); *F01P 5/06* (2013.01)

(58) Field of Classification Search
CPC .................................. F02F 9/0866; F01P 5/06
See application file for complete search history.

(56) References Cited

U.S. PATENT DOCUMENTS

| | | | | |
|---|---|---|---|---|
| 4,828,017 A * | 5/1989 | Watanabe | ............... | B60K 11/04 165/41 |
| 4,862,981 A * | 9/1989 | Fujikawa | ............... | F02B 75/007 180/900 |
| 6,073,594 A * | 6/2000 | Tsukiana | ............... | F28D 1/0435 123/41.55 |
| 6,298,819 B1 * | 10/2001 | Johnson | ................... | F01P 11/12 55/408 |
| 7,160,080 B2 * | 1/2007 | Lin | ....................... | F04D 29/582 416/247 R |
| 8,632,137 B2 | 1/2014 | Auch et al. | | |
| 9,446,804 B2 * | 9/2016 | Haven | ...................... | E02F 9/02 |
| 11,208,163 B2 | 12/2021 | Freeman | | |
| 2002/0003381 A1 * | 1/2002 | Nelson | ............... | F04D 25/0646 310/67 R |
| 2003/0015361 A1 * | 1/2003 | Bland | ..................... | F01P 5/043 180/68.1 |
| 2010/0242866 A1 * | 9/2010 | Buchmann | ............... | F01P 11/12 165/104.19 |
| 2014/0123609 A1 * | 5/2014 | Hollatz | ................. | B60K 11/08 55/282 |
| 2017/0211593 A1 * | 7/2017 | King | ..................... | F04D 29/703 |
| 2021/0010600 A1 | 1/2021 | McCartney | | |
| 2021/0170833 A1 | 6/2021 | Henderson et al. | | |
| 2022/0042601 A1 | 2/2022 | Brown et al. | | |

FOREIGN PATENT DOCUMENTS

| | | |
|---|---|---|
| CN | 203599970 U | 5/2014 |
| CN | 203740112 U | 7/2014 |
| CN | 208281221 U | 12/2018 |

* cited by examiner

*Primary Examiner* — Long T Tran (57) ABSTRACT

A guard for a radiator blower unit includes a body, a flange, and a lip. The body defines a first end, a second end, and a conduit extending from the first end to the second end. The flange is arranged at the first end to mount the body to a radiator frame such that the second end is directed towards the radiator blower unit. The flange defines a first aperture open to the conduit at the first end. The lip is arranged to least partially surround the body at the second end to define a second aperture open to the conduit at the second end. The first aperture, the second aperture, and the conduit combinedly define a passageway that at least in part encompasses a connection interface defined between the radiator blower unit and a motor. At least a portion of the lip extends outwardly and away from the body.

20 Claims, 7 Drawing Sheets

GUARD FOR RADIATOR BLOWER UNITS OF MACHINES

TECHNICAL FIELD

The present disclosure relates to work machines, such as landfill compactors. More particularly, the present disclosure relates to a guard for a radiator blower unit of a work machine.

BACKGROUND

Work machines, such as landfill compactors, are commonly applied at worksites, such as landfills, that generally include harsh and inhospitable terrains. A landfill compactor, for example, generally includes one or more compactor wheels that, while serving as traction elements of the landfill compactor also compact an underlying volume of the landfill deposits. By landfill compaction, landfill compactors maximize use of the associated worksite. However, elements, such as trash and/or debris commonly found at such worksites, can interfere with a working of such work machines.

United States Patent Application No. 20210170833 relates to a recreational vehicle air conditioner that includes an indoor cover defining an indoor air plenum, an outdoor air plenum, and a shaft aperture. An indoor fan is positioned within the indoor air plenum, a drive motor is positioned in the outdoor air plenum, and the indoor fan and the drive motor are coupled by a drive shaft that passes through the shaft aperture. A debris shield, such as an annular rubber washer, is positioned around the drive shaft within the outdoor air plenum for blocking debris from passing through the shaft aperture.

SUMMARY OF THE INVENTION

In one aspect, the disclosure relates to a guard for a radiator blower unit. The guard includes a body, a flange, and a lip. The body defines a first end, a second end, and a conduit extending from the first end to the second end. The flange is arranged at the first end to mount the body to a radiator frame facilitating an extension of the body from the radiator frame towards the radiator blower unit such that the second end is directed towards the radiator blower unit. The flange defines a first aperture open to the conduit at the first end. The lip is arranged to least partially surround the body at the second end to define a second aperture open to the conduit at the second end. The first aperture, the second aperture, and the conduit combinedly define a passageway that at least in part encompasses a connection interface defined between the radiator blower unit and a motor that powers a rotation of the radiator blower unit through the connection interface. Further, at least a portion of the lip extends outwardly and away from the body, in a direction transversal to the extension of the body.

In another aspect, the disclosure is directed to a work machine. The work machine includes a radiator frame for a radiator of the work machine, a radiator blower unit to cool a coolant from a power source by blowing and forcing air across the radiator, a motor to power a rotation of the radiator blower unit through a connection interface, and a guard for the radiator blower unit. The guard includes a body, a flange, and a lip. The body defines a first end, a second end, and a conduit that extends from the first end to the second end. The flange is arranged at the first end to mount the body to the radiator frame facilitating an extension of the body from the radiator frame towards the radiator blower unit such that the second end is directed towards the radiator blower unit. The flange defines a first aperture open to the conduit at the first end. The lip is arranged to least partially surround the body at the second end to define a second aperture open to the conduit at the second end. The first aperture, the second aperture, and the conduit combinedly define a passageway that at least in part encompasses the connection interface. Further, at least a portion of the lip extends outwardly and away from the body, in a direction transversal to the extension of the body.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
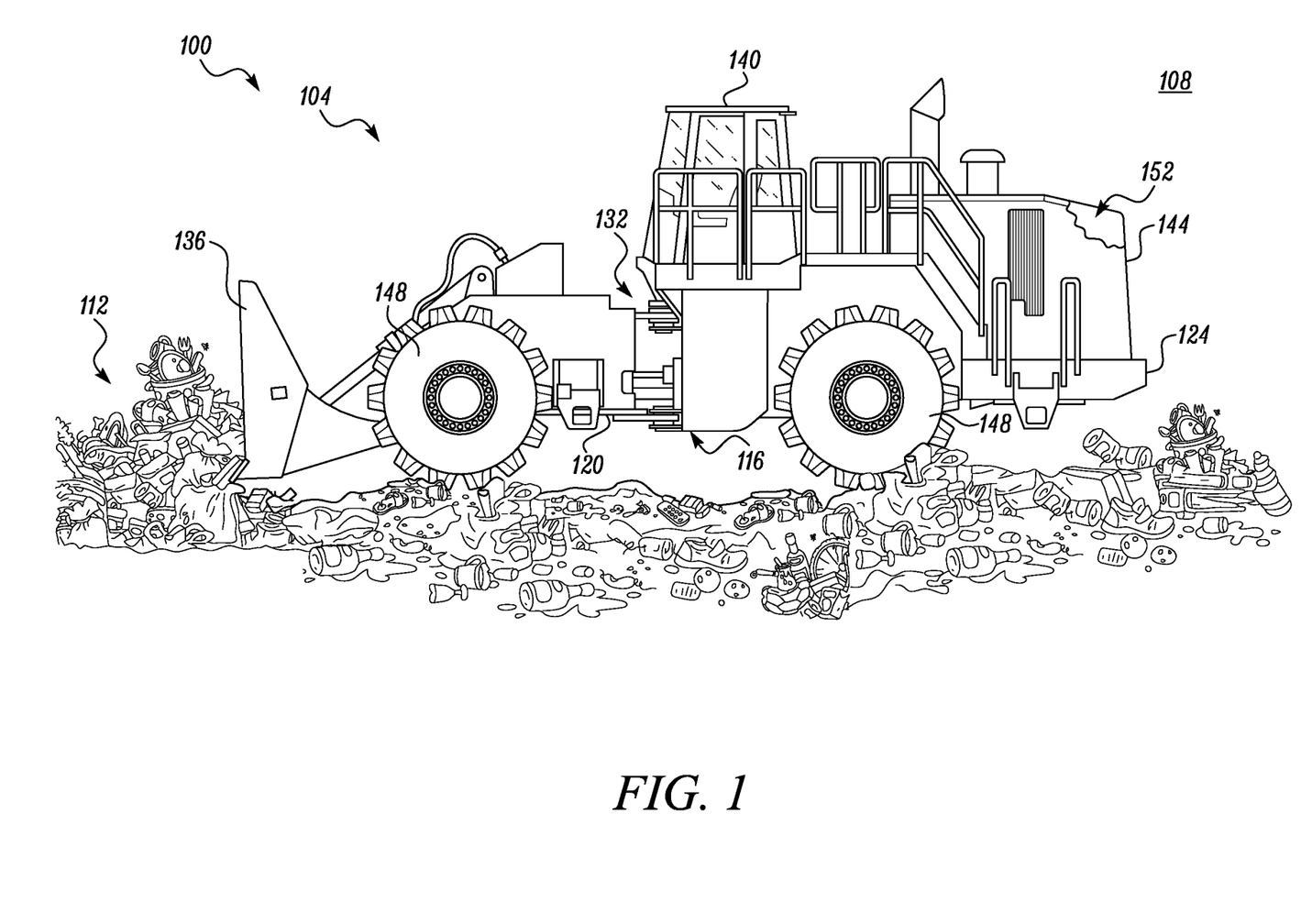
FIG. 1 a side view of an exemplary work machine having a power compartment, in accordance with an embodiment of the present disclosure.

Referring to FIG. 1, an exemplary work machine 100 is shown. The work machine 100 may be a landfill compactor 104, which may be configured to operate at a worksite 108 having a landfill 112. The work machine 100 (or simply, machine 100 hereinafter) may include main frame 116, which may include a split frame configuration having a forward frame portion 120 and a rearward frame portion 124. The rearward frame portion 124 may be coupled to the forward frame portion 120 at a hitch location 132. The forward frame portion 120 may include and/or accommodate a work implement 136, such as a blade or a moldboard, as shown. The rearward frame portion 124 may accommodate and/or include an operator cabin 140 and a power compartment 144 that may house a power source (not shown). The power source may include an internal combustion engine (or simply, an engine hereinafter) of the machine 100. Both the forward frame portion 120 and the rearward frame portion 124 may accommodate or support one or more traction devices 148, as shown. The traction devices 148, in some embodiments, may also serve as compactors to compact an underlying volume of landfill deposits at the worksite 108.

The engine, housed within the power compartment 144 of the machine 100, may generate motive power and which may be supplied to various systems and sub-systems of the machine 100 so as to power various functions and/or operations of the machine 100. Such functions and/or operations may include, but not limited to, an actuation or a manipulation of the work implement 136, a movement of the machine 100 over the landfill 112, and/or an operation of one or more electric motors (not shown) that may be associated with the machine 100. It is to be noted that any ascription of the machine 100 to include the landfill compactor 104 and to its type or configuration as discussed in the present disclosure is purely exemplary, and those skilled in the art may contemplate a suitable application of the aspects of the present disclosure into a variety of other machines, which may include, but not limited to, excavators, loaders, dozers, milling machines, shovels, generator sets, and/or the like machines, or into any machine or system that utilizes a power source, such as an internal combustion engine, to power one or more of its functions.

Figure 2:
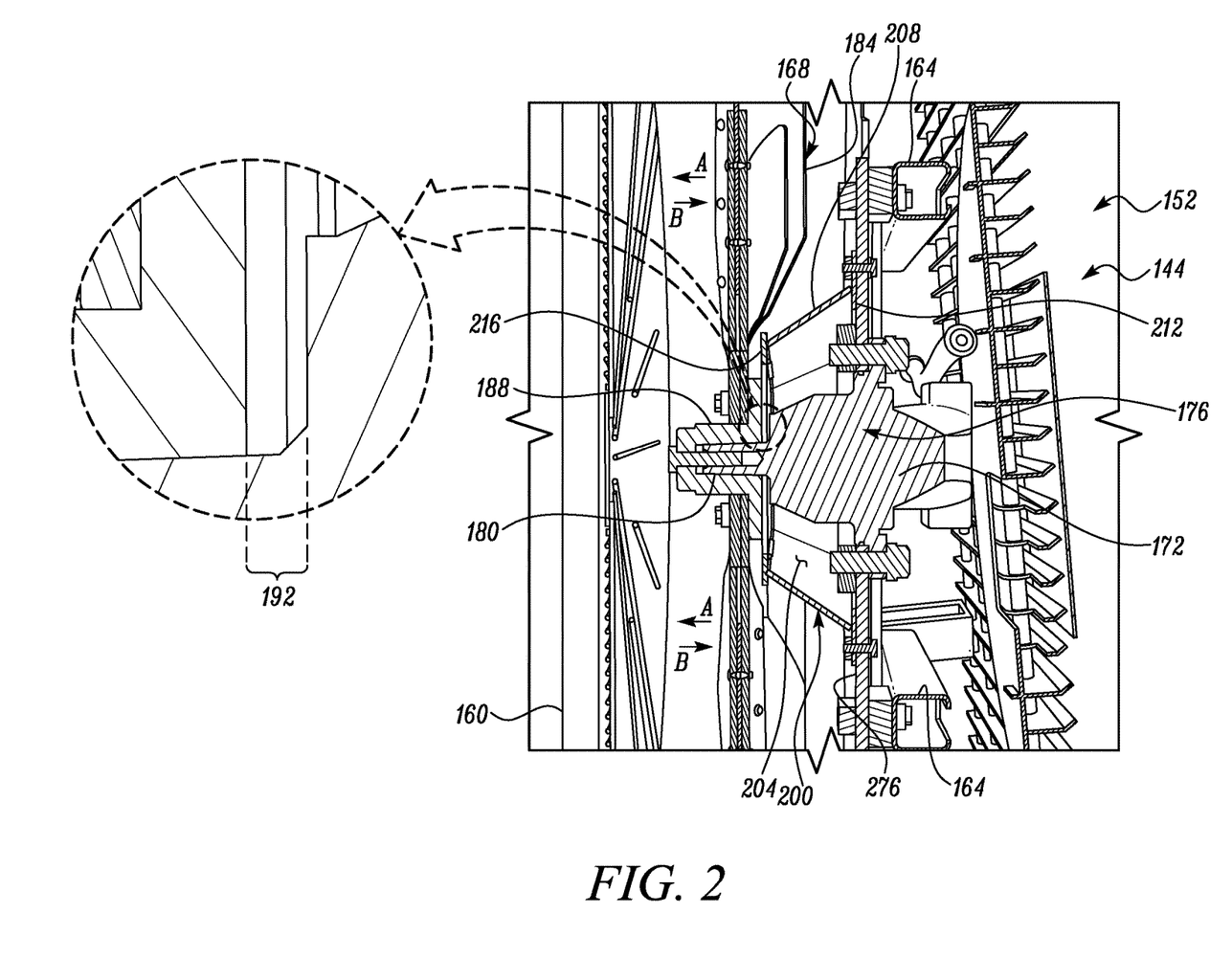
FIG. 2 is an interior sectional view of a portion of the power compartment illustrating exemplary details related to a radiator, a radiator frame, and a radiator blower unit, housed within the power compartment, in accordance with various embodiments of the present disclosure.

Referring to FIG. 2, the power compartment 144 may define an interior 152 that may house a variety of components or apparatuses associated with the power source or the engine. For example, the component or apparatuses may include a radiator 160, a radiator frame 164, a radiator fan unit or a radiator blower unit 168, and a motor 172. Each of the radiator 160, the radiator frame 164, the radiator blower unit 168, and the motor 172, may form part of a radiator assembly or a radiator system that may function in concert, to dissipate heat from the engine so as to help the engine attain (or brought low to) a temperature that is suitable for its working and for the generation of motive power.

Figure 3:
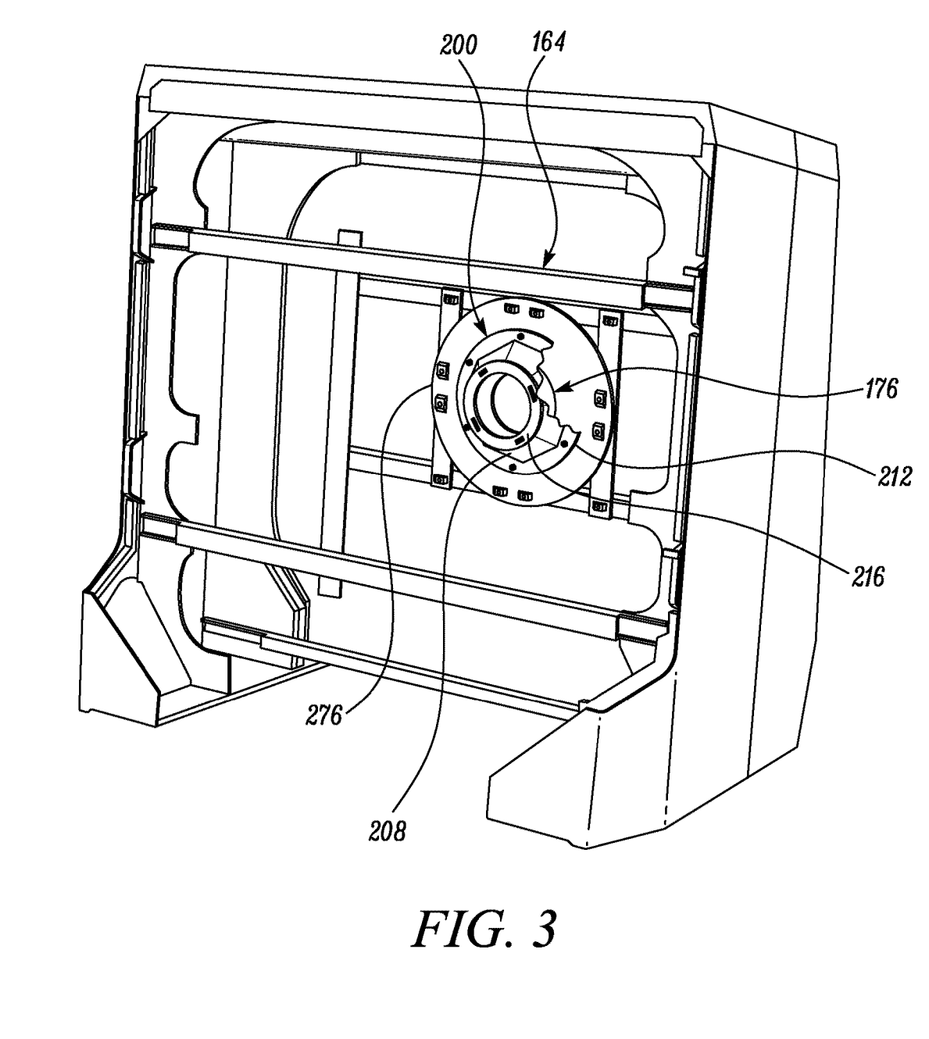
FIG. 3 is a perspective view of the radiator frame illustrated in conjunction with a guard for the radiator blower unit, in accordance with an embodiment of the present disclosure.
Figure 4:
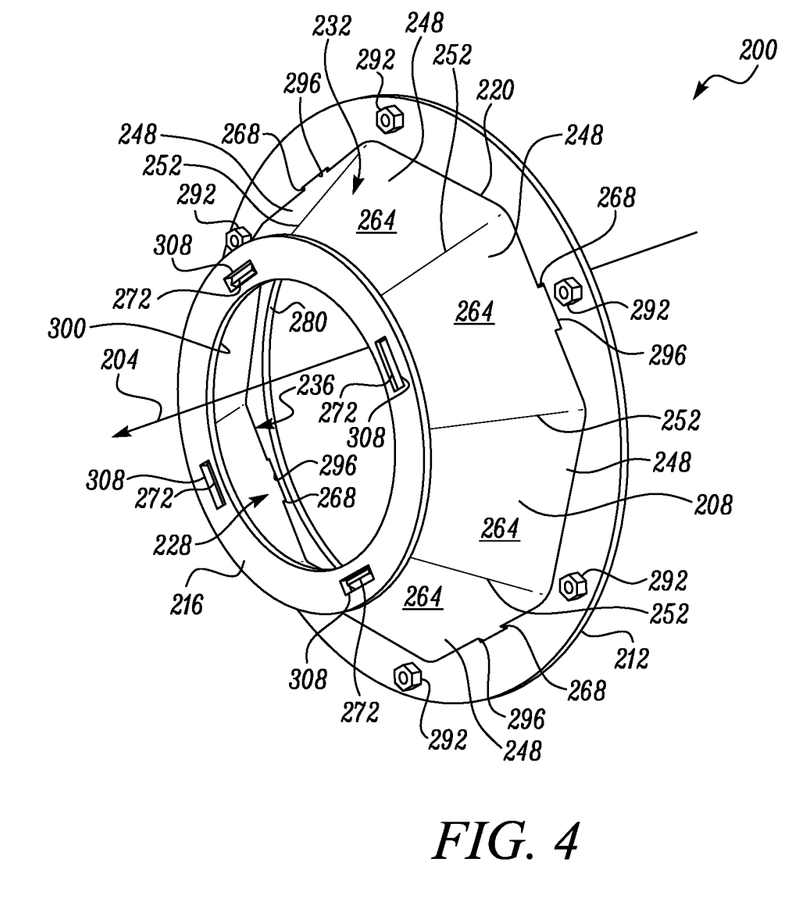
FIG. 4 is a front perspective view of the guard, in accordance with various embodiments of the present disclosure.

Referring to FIGS. 2 and 3, the radiator frame 164 may be part of the main frame 116 and/or may extend from the main frame 116 of the machine 100 (for example, from the rearward frame portion 124 of the main frame 116 of the machine 100) although it is possible for the radiator frame 164 to be independent of the main frame 116 of the machine 100. The radiator frame 164 may include engagement regions (not shown), and one or more components or apparatuses of the power compartment 144 may be positioned against said engagement regions so that those components or apparatuses may be coupled or mounted (e.g., fixedly and immovably) to the radiator frame 164. Additionally, the radiator frame 164 may define a frame opening 176, as shown in FIG. 3.

The radiator 160 may be one among those components or apparatuses that may be coupled and/or mounted to the radiator frame 164. The radiator 160 can include one or more cooling cores into which a coolant (e.g., a volume of coolant carrying heat from the power source or the engine) may be received into so that the coolant can be passed throughout the cooling cores of the radiator 160. Air may be blown or forced across the radiator 160 (by a working of the radiator blower unit 168) such that the coolant passing through the cooling cores of the radiator 160 may be cooled and so that the coolant's temperature be lowered. In so doing, a relatively cooled volume of the coolant may be produced by the radiator 160 at an outlet (not shown) of the radiator 160, and, from said outlet, the cooled volume of the coolant may be returned into an associated cooling circuit such that the cooled volume of coolant can be recirculated for reuse (i.e., for transferring and/or dissipating heat from the engine in one or more subsequent cycles of operations of the engine).

The motor 172 may be disposed through the frame opening 176, as shown, although in actual practice and application, the motor 172 can assume other locations or be positioned elsewhere on the radiator frame 164 or around the radiator frame 164. The motor 172 may be powered electrically and/or hydraulically, although the motor 172 may be powered through other means, which may be now known or in the future developed. As an example, the motor 172 may include an electric motor which may source electrical power from the motive power generated by the engine. The motor 172 may also include an output shaft 180 extending outwards of the motor 172, as shown in FIG. 2. The output shaft 180 may rotate as and when the motor 172 receives the hydraulic or electrical power such that rotary power may be outputted from the motor 172. Said rotary power may be applied to power or rotate the radiator blower unit 168.

The radiator blower unit 168 may be mounted to the output shaft 180 (or to an end of the output shaft 180 that protrudes outwards of the motor 172, as shown) to receive the rotary power from the output shaft 180. More particularly, the radiator blower unit 168 includes a blower 184 and an adaptor 188. The adaptor 188 may be mounted (e.g., fixedly) to the output shaft 180 (or to the end of the output shaft 180) and the blower 184 may be in turn mounted (e.g., fixedly) onto the adaptor 188. When the output shaft 180 rotates or as and when the output shaft 180 outputs the rotary power, the radiator blower unit (i.e., both the blower 184 and the adaptor 188) may be run or rotated (e.g., in commensuration or in sync with the rotation of the output shaft 180). The rotation of the radiator blower unit 168 (or the blower 184) may cause a volume or air to be drawn into the blower 184 and then said volume of air may be delivered across the radiator 160 to cool the coolant passing through the cooling cores of the radiator 160. Further, depending upon the direction of rotation of the radiator blower unit 168 or the blower 184, the volume of air may be either forced into the radiator 160 (see direction, A, FIG. 2) or forced out of the radiator 160 (see direction, B, FIG. 2).

With continued reference to FIG. 2, the output shaft 180 may form part of a connection interface 192 between the motor 172 and the radiator blower unit 168 such that the motor 172 can power a rotation of the radiator blower unit 168 through the connection interface 192. In some embodiments, said connection interface 192 may include a variety of other parts and components, for example, one or more of fasteners, keys, keyways, lip seals, washers, and the like, which may enable the motor 172 to remain operatively coupled and engaged with the radiator blower unit 168, such that as and when rotary power is outputted by the motor 172 by way of the output shaft 180, the radiator blower unit 168 may receive the rotary power through the output shaft 180.

The forthcoming disclosure relates to a guard 200 for the radiator blower unit 168. The guard 200 defines an enclosure and/or a passageway 204 that provides a passage to the connection interface 192 therethrough. The guard 200 also screens or shields the connection interface 192 from elements, e.g., wires, debris, plastic bags, and lightweight airborne debris of the external environment, that may possess the potential to interfere with the working of the connection interface 192, and, thus, the working of one or both of the radiator blower unit 168 and/or the motor 172. An external environment, as noted, may not necessarily mean or be limited to an environment external to the machine 100, but may also refer to an environment within the power compartment 144 referred to as the interior 152, but which is defined outside the guard 200. Further details related to the guard 200 shall now be discussed. The guard 200 includes a body 208, a flange 212, and a lip 216.

Referring to FIGS. 4, 5, 6, and 7, the body 208 defines a first end 220 and a second end 224. The second end 224 may be defined oppositely (e.g., axially oppositely) to the first end 220. Further, the body 208 may also define a conduit 228 that extends from the first end 220 to the second end 224. The body 208 may include a frustoconical segment 232 defining a first opening 236 of the conduit 228 at the first end 220 and a second opening 240 of the conduit 228 at the second end 224. An area of the first opening 236 may be larger than an area of the second opening 240, and owing to the frustoconical shape of the frustoconical segment 232, the body 208 may taper down from a broader or a wider first end 220 to a narrower second end 224.

In some embodiments, the frustoconical segment 232 defines a segment axis 244 and a number of sections 248 rotationally arrayed about the segment axis 244. The sections 248 may be serially disposed along an annular path defined by the frustoconical segment 232 about or around the segment axis 244. In some embodiments, each section 248 may share a bent edge interface 252 with an adjacent section 248. Further, and as an example, the bent edge interface 252 may span from the first end 220 to the second end 224 of the body 208 and may define a bent edge axis (e.g., see bent edge axis 256 exemplarily annotated corresponding to a single bent edge interface 252 in FIG. 5) such that a transition in gradient between any two sections 248 may be observed as one moves along the annular path defined by the frustoconical segment 232.

Figure 5:
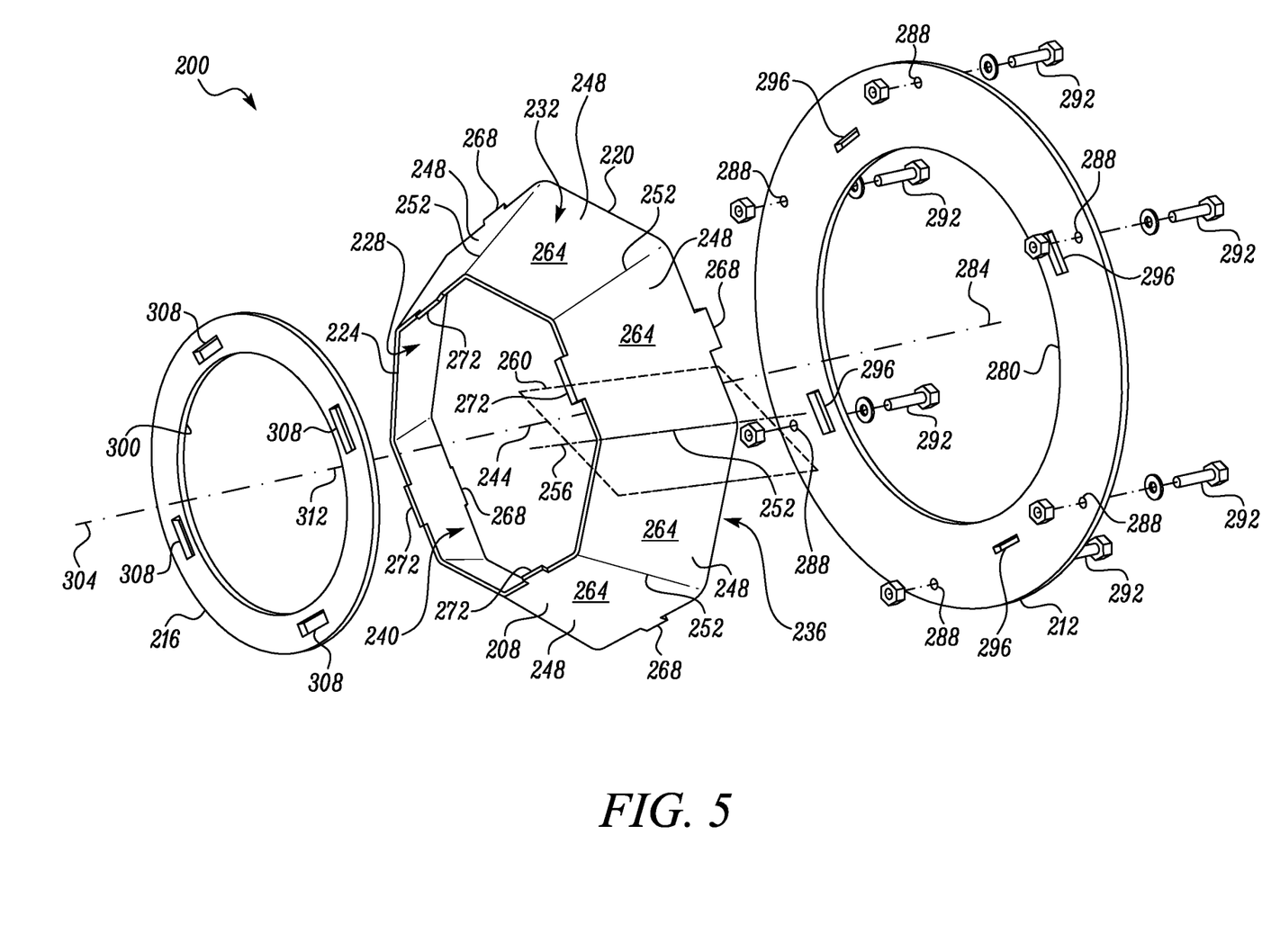
FIG. 5 is an exploded view of the guard, in accordance with various embodiments of the present disclosure.
Figure 6:
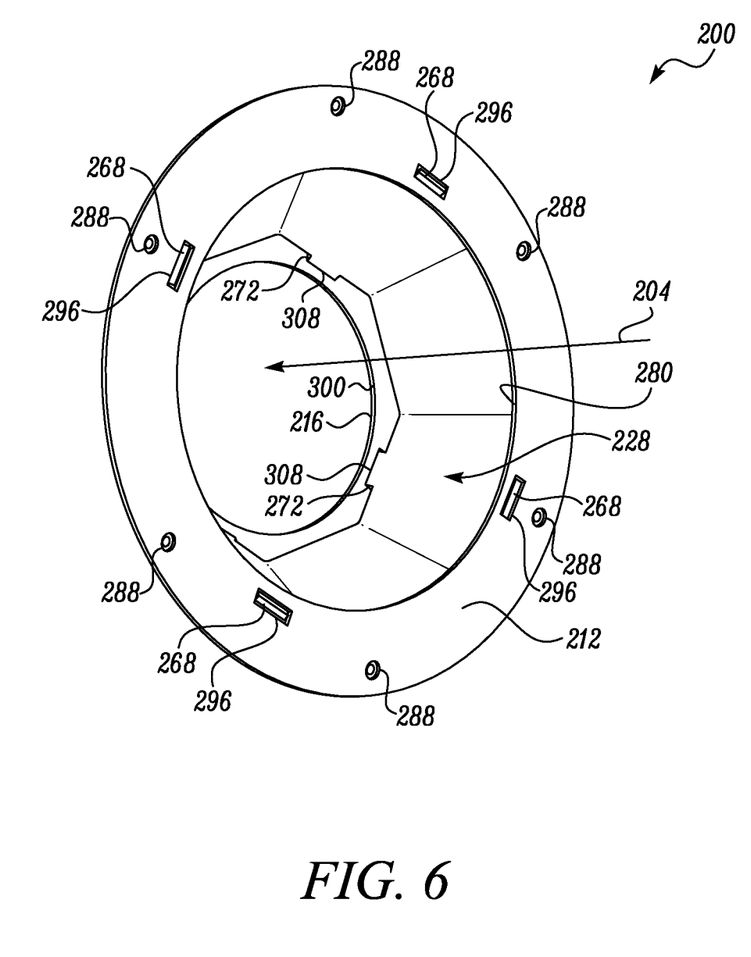
FIG. 6 is a rear perspective view of the guard, in accordance with various embodiments of the present disclosure.
Figure 7:
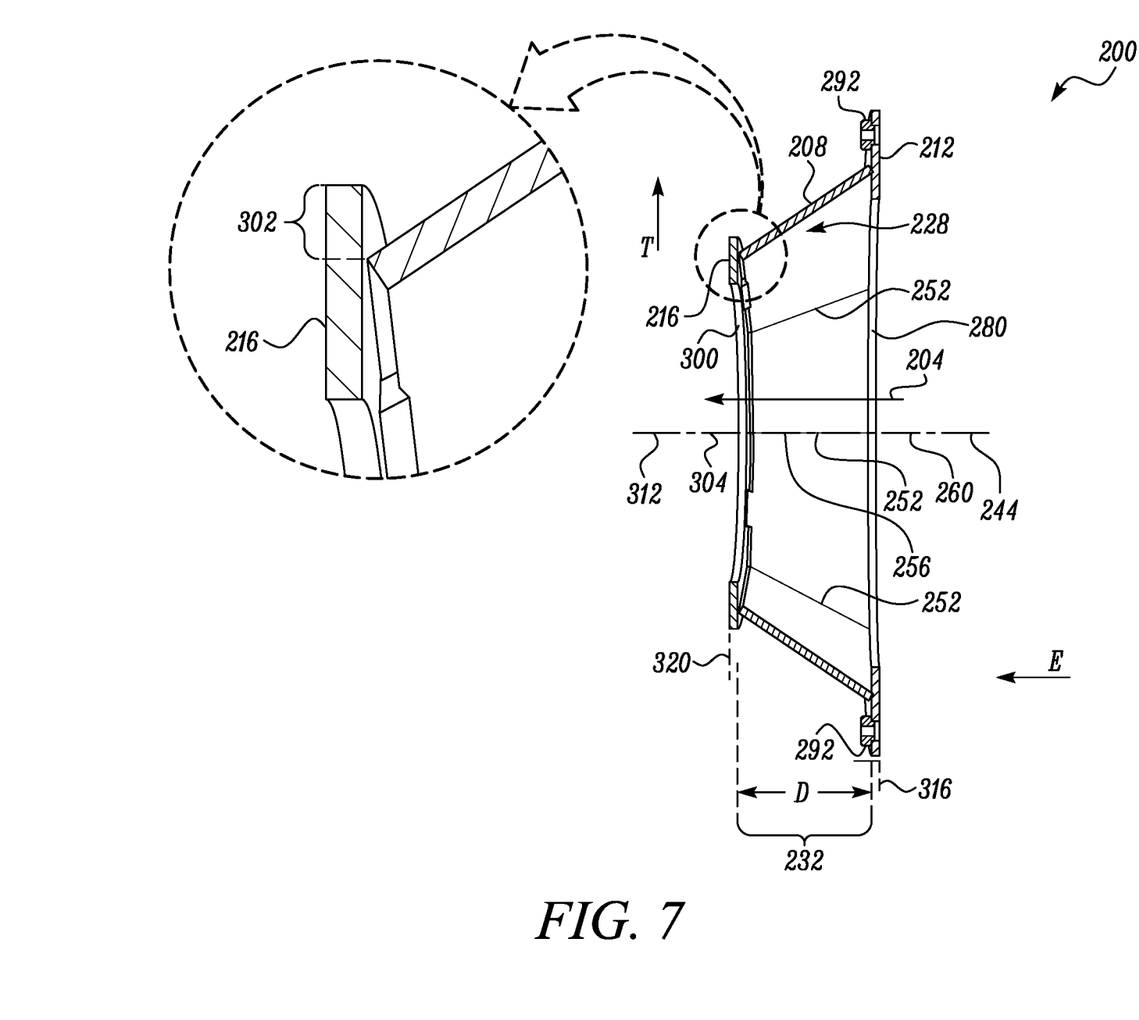
FIG. 7 is a cross-sectional view of the guard, in accordance with various embodiments of the present disclosure.

Although not limited, both the bent edge axis 256 and the segment axis 244 may be disposed to extend in and along a common plane (e.g., see common plane 260 exemplarily illustrated corresponding to the bent edge axis 256 of FIG. 5). Additionally, or optionally, each section 248 may also define a flat surface 264, and a flat surface 264 may extend across or throughout an expanse of the corresponding section 248 in which it is defined. Given the flat surfaces 264 of the sections 248, the first opening 236 and the second opening 240 of the conduit 228 may correspondingly define a first polygonal shape and a second polygonal shape (best shown in FIG. 5). The above discussed frustoconical shape of the frustoconical segment 232 and/or the polygonal shapes of the first opening 236 and the second opening 240 may improve and/or ease a manufacturability of the body 208 (and/or the guard 200).

In some embodiments, the body 208 may be made from one or more strip pieces of sheet metal and conventional sheet metal operations, such as rolling, shearing, stamping, and/or the like operations, may be applied to obtain the body 208. For example, the body 208 may be formed from dual strip pieces (e.g., dual curved strip pieces) of sheet metal, although it is possible that the body 208 be formed from other manufacturing process, such as from a single piece sheet metal or by casting a material in one or more molds. A manufacturing process may exemplarily include bending the sheet metal or one or more strip pieces of the sheet metal in a brake press. In the case of forming the body 208 from dual strip pieces of sheet metal, each strip piece of the dual strip pieces of sheet metal may be bent multiple times such that multiple sections 248, and its aforementioned features thereof, e.g., the bent edge interfaces 252 and the flat surfaces 264 may be correspondingly defined on each strip piece. Thereafter, different dual strip pieces may be brought together so that they can be connected to each other (e.g., by seam welding or the like operation) such that the frustoconical segment 232 of the body 208 may be formed. Although the above description, the body 208 (or the guard 200) may be formed by other methods now known or in the future developed.

Further, and although not limited, the body 208 may exemplarily define a number of first tabs 268 and second tabs 272. The first tabs 268 may be defined at the first end 220 and the second tabs 272 may be defined at the second end 224. Both the first tabs 268 and the second tabs 272 may be extended integrally and contiguously from the body 208. As an example, each first tab 268 may extend outwards from a section 248 of the body 208 in and along a plane in which the flat surface 264 of the section 248 is defined. Further, as an example, one first tab 268 may extend outwards from one section 248 of the body 208. Similarly, and as an example, each second tab 272 may extend outwards from a section 248 of the body 208 in and along a plane in which the flat surface 264 of the section 248 is defined. Also, as an example, one second tab 272 may extend outwards from one section 248 of the body 208. Also, not each section 248 may have either of a first tab 268 or a second tab 272 extended therefrom, and, for example, it is possible for the one or both the first tabs 268 and the second tabs 272 to be provided so that they extend from sections 248 that are alternatively disposed along the annular path defined by the body 208.

The flange 212 may be arranged (e.g., immovably) at the first end 220 of the body 208, and may be applied to mount the body 208 to the radiator frame 164 (e.g., against an edge plate 276 (also see FIG. 3) of the radiator frame 164 that defines the frame opening 176). In so doing, the flange 212 facilitates an extension, E, (see FIG. 7) of the body 208 from the radiator frame 164 towards the radiator blower unit 168 such that the second end 224 of the body 208 is directed towards the radiator blower unit 168, as shown. Although a shape and profile of the flange 212 is not limited, the flange 212 can include a planarly extending disc-shaped structure that defines a first aperture 280, as shown. The first aperture 280 may be open to the conduit 228 at the first end 220. Further, although not limited, the first aperture 280 may be circular shaped defining a flange axis 284. The flange 212 may also define a number of receptacles 288 into which fasteners of a fastener system 292 may be driven into and which then may be engaged with the engagement regions provided on the radiator frame 164 such that the flange 212 (and thus the body 208 and the guard 200) may be mounted to the radiator frame 164.

In some exemplary embodiments, the flange 212 may also define a number of first slots 296. In some embodiments, the first slots 296 may be equal in number to a number of the first tabs 268 and may be complementary in arrangement to an arrangement of the first tabs 268. In so doing, the first slots 296 may correspondingly receive the first tabs 268 to facilitate an assembly of the flange 212 with the body 208 at the first end 220 of the body 208. Once the flange 212 is assembled to the body 208, any exemplary fastening process (e.g., a welding process) may be performed between the flange 212 and the body 208 to couple the flange 212 to the body 208. It may be noted that the slot and tab arrangement, as noted above, may be part of a common fabrication process to help achieve alignment between the body 208 and the flange 212 without a fixture. Further, various other means of achieving the connection between the flange 212 and the body 208 may also be contemplated, and those may or may not include the aforementioned slot and tab arrangement.

The lip 216 may be arranged to least partially surround (or fully surround) the body 208 at the second end 224 to define a second aperture 300. The second aperture 300 may be open to the conduit 228 at the second end 224. Further, at least a portion (e.g., a lip portion 302) of the lip 216 extends outwardly and away from the body 208, in a direction (see direction, T, FIG. 7) which is transversal to the extension, E, of the body 208 from the radiator frame 164 towards the radiator blower unit 168 Alike the flange 212, the lip 216 can include a planarly extending disc-shaped structure, as shown, although other shapes and profiles for the lip 216 may be contemplated. Further, although not limited, the second aperture 300 may be circular shaped defining a lip axis 304. Also, in some embodiments, the lip portion 302 of the lip 216 may be extended or disposed orthogonally or at a right angle with respect to the lip axis 304 (best shown in FIG. 7).

In some exemplary embodiments, the lip 216 may define a number of second slots 308. In some embodiments, the second slots 308 may be equal in number to a number of the second tabs 272 and may be complementary in arrangement to an arrangement of the second tabs 272. In so doing, the second slots 308 may correspondingly receive the second tabs 272 to facilitate an assembly of the lip 216 with the body 208 at the second end 224 of the body 208. Once the lip 216 is assembled to the body 208, any exemplary fastening process (e.g., a welding process) may be performed between the lip 216 and the body 208 to couple the lip 216 to the body 208. It may be noted that the slot and tab arrangement may be part of a common fabrication process to help achieve alignment between the body 208 and the lip 216 without a fixture. Further, various other means of achieving the connection between the lip 216 and the body 208 may also be contemplated, and those may or may not include the aforementioned slot and tab arrangement.

Given the profile of the frustoconical segment 232, an area of the first aperture 280 may be larger than an area of the second aperture 300 such that the first aperture 280 may complement the first opening 236 and the second aperture 300 may complement the second opening 240. Moreover, the first aperture 280, the second aperture 300, and the conduit 228 combinedly define the enclosure or the passageway 204 of the guard 200 that at least in part encompasses the connection interface 192 defined between the radiator blower unit 168 and the motor 172.

Further, in an assembly of the lip 216 and the flange 212 with the body 208, the flange axis 284, the segment axis 244, and the lip axis 304 may fall in line with each other to collectively define a guard axis 312. In other words, the conduit 228, the first aperture 280, and the second aperture 300, may be co-axially aligned with each other along the guard axis 312, and the lip portion 302 of the lip 216 may be accordingly disposed orthogonally with respect to the guard axis 312 (see FIG. 7). Furthermore, it may be noted from the view of the guard provided in FIG. 7 that the flange 212 may extend along in a first plane 316 and the lip 216 may extend along in a second plane 320, and that the first plane 316 may be parallel to the second plane 320. A distance, D, may also be defined between the flange 212 and the lip 216. Although not limited, one or more of the lip 216 and the flange 212 may be formed using sheet metal as well, and for forming the same, one or more conventional sheet metal operations, such as rolling, shearing, stamping, and the like, may be used.

INDUSTRIAL APPLICABILITY

An exemplary process to assemble the guard 200 to the radiator frame 164 may include first arranging the body 208 with the flange 212 and the lip 216. In an exemplary case where the body 208 is prepared separately from the flange 212 and the lip 216, such as by use of sheets metal parts, an operator may cut portions of a sheet metal so as to form one or more strip pieces of sheet metal (e.g., arcuate strip pieces of sheet metal so that they can be formed into the frustoconical segment 232 of the body 208). Thereafter, the operator may bend (e.g., using a brake press) each strip piece multiple times serially along a length (e.g., an arcuate length) of each strip piece, such that, on each strip piece, multiple sections (to conform to sections 248) can be serially formed. In process of bending each strip piece, the operator may turn the opposite ends of each strip piece towards each other. In that manner, each strip piece may be set to form at least a portion of the frustoconical segment of the body.

When multiple strip pieces of sheet metal are being used, ends of the multiple strip pieces may be appropriately brought together and then connected (e.g., by seam welding or the like fastening process) with each other so that the multiple strip pieces can cohesively form the frustoconical segment 232 of the body 208. The operator may apply conventional sheet metal operations, such as rolling, shearing, stamping, and/or the like, so as to obtain the strip pieces and to form the body 208. As discussed above, both the flange 212 and the lip 216 may be made from a sheet metal as well, and it is possible for the operator to use conventional sheet metal operations, such as rolling, shearing, stamping, and/or the like, to form one or more of the flange 212 and the lip 216.

Once the body 208, the flange 212, and the lip 216, are formed, the flange 212 may be arranged at the first end 220 and the lip 216 may be arranged at the second end 224. To arrange the flange 212 at the first end 220, an operator may align the first tabs 268 with the first slots 296 and then insert the first tabs 268 into the first slots 296. Thereafter, the first tabs 268 may be secured into the first slots 296, e.g., by methods such as welding. In that manner, the flange 212 may be fixedly retained with the first end 220 of the body 208. Similarly, to arrange the lip 216 at the second end 224, an operator may align the second tabs 272 with the second slots 308 and then may insert the second tabs 272 into the second slots 308. Thereafter, the second tabs 272 may be secured into the second slots 308, e.g., by methods such as welding. In that manner, the lip 216 may be fixedly retained with the second end 224 of the body 208. It may be noted that as the lip 216 is arranged at the second end 224, at least the lip portion 302 of the lip 216 extends outwardly and away from the body 208, in the direction, T, which may be transversal to the extension, E, of the body 208.

In that manner, the guard 200 may be formed. Once the guard 200 is formed and/or acquired, the operator may align the guard 200 with the radiator frame 164 such that the flange 212 is directed towards engagement regions of the radiator frame 164. Thereafter, the operator may fasten the flange 212 to the radiator frame 164 by use of the fastener system 292. Once the flange 212 is fastened, the body 208 and/or the guard 200 extends along the extension, E, towards the radiator blower unit 168, such that the second end 224 of the body 208 and/or the lip 216 is directed towards the radiator blower unit 168 and such that the passageway 204 at least in part encompasses the connection interface 192 defined between the radiator blower unit 168 and the motor 172. The lip 216 may also define a minimum clearance with the radiator blower unit 168.

The arrangement as attained by the guard 200 between the radiator blower unit 168 and the radiator frame 164, encompasses and shields the connection interface 192 disposed between the radiator blower unit 168 and the motor 172. A shielding of the connection interface 192 disallows ingress of elements, such as debris, plastic bags, wires, and the like, from the external environment, i.e., the environment disposed outside the guard 200 and/or the environment defined at the worksite 108. In that manner, the guard 200 protects the various components of the connection interface 192, such as fasteners, keys, keyways, lip seals, washers, and the like. The lip portion 302, in particular, serves as a barrier or a deterrence against the entrance of the aforesaid elements into the passageway 204 by safety catching those elements and inhibiting their further progress into the vicinity of the connection interface 192. By preventing ingress of such elements, the connection interface 192, and thus, the radiator blower unit 168 and/or the motor 172 are prevented from faults, leaks, and/or malfunction, thus prolonging their useful lives, decreasing machine downtime, and improving worksite productivity.

Some exemplary dimensions and/or details associated with the guard 200 are now provided. A height of the lip portion 302 (e.g., a height with respect to the body 208) may range from 8 millimeters (mm) to 16 mm. Said range may be accommodative or inclusive of any variation that may arise in the height of the lip portion 302 as one follows an annular path defined on the lip portion 302—the variation arises since the second aperture 300 may be circular while the second opening 240 may be polygonal, and as one follows an annular path defined on the lip portion 302, the variation in the height of the lip portion 302 with respect to the body 208 may be observed. The height of the lip portion 302, by in itself, may vary by about 3 mm along the annular path defined on the lip portion 302.

As part of some further exemplary dimensions and details associated with the guard 200, a diameter of the second aperture 300 may range from 200 to 220 mm; an outer diameter of the flange 212 may range from 440 to 460 mm; and the distance, D, between the flange 212 and the lip 216 may range from 90 to 110 mm. Also, as an example, the total number of sections 248 defined on the body 208 may be eight (8). Said dimensions and details have been provided for exemplary and/or illustrative purposes alone and thus they need not be seen as limiting in any way. Actual applications can have differing dimensions and details than what is exemplarily disclosed herein.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A guard for a radiator blower unit, the guard comprising:
    a body defining a first end, a second end, and a conduit extending from the first end to the second end;
    a flange arranged at the first end to mount the body to a radiator frame, the flange defining a first aperture open to the conduit at the first end; and
    a lip arranged to least partially surround the body at the second end to define a second aperture open to the conduit at the second end, wherein
        the first aperture, the second aperture, and the conduit collectively define a passageway,
        at least a portion of the lip extends outwardly and away from the body, in a direction transverse to an extension of the body, and
        the conduit of the body fully encloses the passageway.

2. The guard of claim 1, wherein the body includes a frustoconical segment defining a first opening of the conduit at the first end and a second opening of the conduit at the second end.

3. The guard of claim 2, wherein an area of the first opening is larger than an area of the second opening, and, correspondingly, an area of the first aperture is larger than an area of the second aperture.

4. The guard of claim 2, wherein the frustoconical segment defines a segment axis and a plurality of sections rotationally arrayed about the segment axis, the plurality of sections being serially disposed along an annular path defined by the frustoconical segment about the segment axis.

5. The guard of claim 4, wherein each section of the plurality of sections shares a bent edge interface with an adjacent section of the plurality of sections, wherein
    the bent edge interface spans from the first end to the second end of the body and defines a bent edge axis, and
    both the bent edge axis and the segment axis are disposed to extend in a common plane.

6. The guard of claim 4, wherein each section of the plurality of sections defines a flat surface.

7. The guard of claim 2, wherein the first opening and the second opening correspondingly define a first polygonal shape and a second polygonal shape and the first aperture and the second aperture are both circular shaped.

8. The guard of claim 1, wherein the body defines a plurality of first tabs at the first end and a plurality of second tabs at the second end, the flange and the lip correspondingly defining a plurality of first slots and a plurality of second slots, wherein the plurality of first slots correspondingly receive the plurality of first tabs to couple the flange to the body and the plurality of second slots correspondingly receive the plurality of second tabs to couple the lip to the body.

9. The guard of claim 1, wherein the conduit, the first aperture, and the second aperture, are co-axially aligned with each other along a guard axis and the portion of the lip is disposed orthogonally with respect to the guard axis.

10. The guard of claim 1, wherein the flange extends along in a first plane and the lip extends along in a second plane, wherein the first plane is parallel with respect to the second plane.

11. A work machine, comprising:
    a radiator frame for a radiator of the work machine;
    a radiator blower unit configured to cool a coolant from a power source by blowing and forcing air across the radiator;
    a motor to power a rotation of the radiator blower unit through a connection interface between the radiator blower unit and the motor and extending parallel to an axis of the motor; and
    a guard for the radiator blower unit, the guard at least partially surrounding the connection interface and including:
        a body defining a first end, a second end, and a conduit extending from the first end to the second end;
        a flange arranged at the first end to mount the body to the radiator frame facilitating an extension of the body from the radiator frame towards the radiator blower unit such that the second end is directed towards the radiator blower unit, the flange defining a first aperture open to the conduit at the first end; and a lip arranged to least partially surround the body at the second end to define a second aperture open to the conduit at the second end, wherein the first aperture, the second aperture, and the conduit collectively define a passageway in which the connection interface is located, and at least a portion of the lip extends outwardly and away from the body, in a direction transversal to the extension of the body.

12. The work machine of claim 11, wherein the body includes a frustoconical segment defining a first opening of the conduit at the first end and a second opening of the conduit at the second end.

13. The work machine of claim 12, wherein an area of the first opening is larger than an area of the second opening, and, correspondingly, an area of the first aperture is larger than an area of the second aperture.

14. The work machine of claim 12, wherein the frustoconical segment defines a segment axis and a plurality of sections rotationally arrayed about the segment axis, the plurality of sections being serially disposed along an annular path defined by the frustoconical segment about the segment axis.

15. The work machine of claim 14, wherein each section of the plurality of sections shares a bent edge interface with an adjacent section of the plurality of sections, wherein the bent edge interface spans from the first end to the second end of the body and defines a bent edge axis, and both the bent edge axis and the segment axis are disposed to extend in a common plane.

16. The work machine of claim 14, wherein each section of the plurality of sections defines a flat surface.

17. The work machine of claim 12, wherein the first opening and the second opening correspondingly define a first polygonal shape and a second polygonal shape and the first aperture and the second aperture are both circular shaped.

18. The work machine of claim 11, wherein the body defines a plurality of first tabs at the first end and a plurality of second tabs at the second end, the flange and the lip correspondingly defining a plurality of first slots and a plurality of second slots, wherein the plurality of first slots correspondingly receive the plurality of first tabs to couple the flange to the body and the plurality of second slots correspondingly receive the plurality of second tabs to couple the lip to the body.

19. The work machine of claim 11, wherein the conduit, the first aperture, and the second aperture, are co-axially aligned with each other along a guard axis and the portion of the lip is disposed orthogonally with respect to the guard axis.

20. The work machine of claim 11, wherein the flange extends along in a first plane and the lip extends along in a second plane, wherein the first plane is parallel with respect to the second plane.

* * * * *